United States Patent Office 2,720,810
Patented Oct. 18, 1955

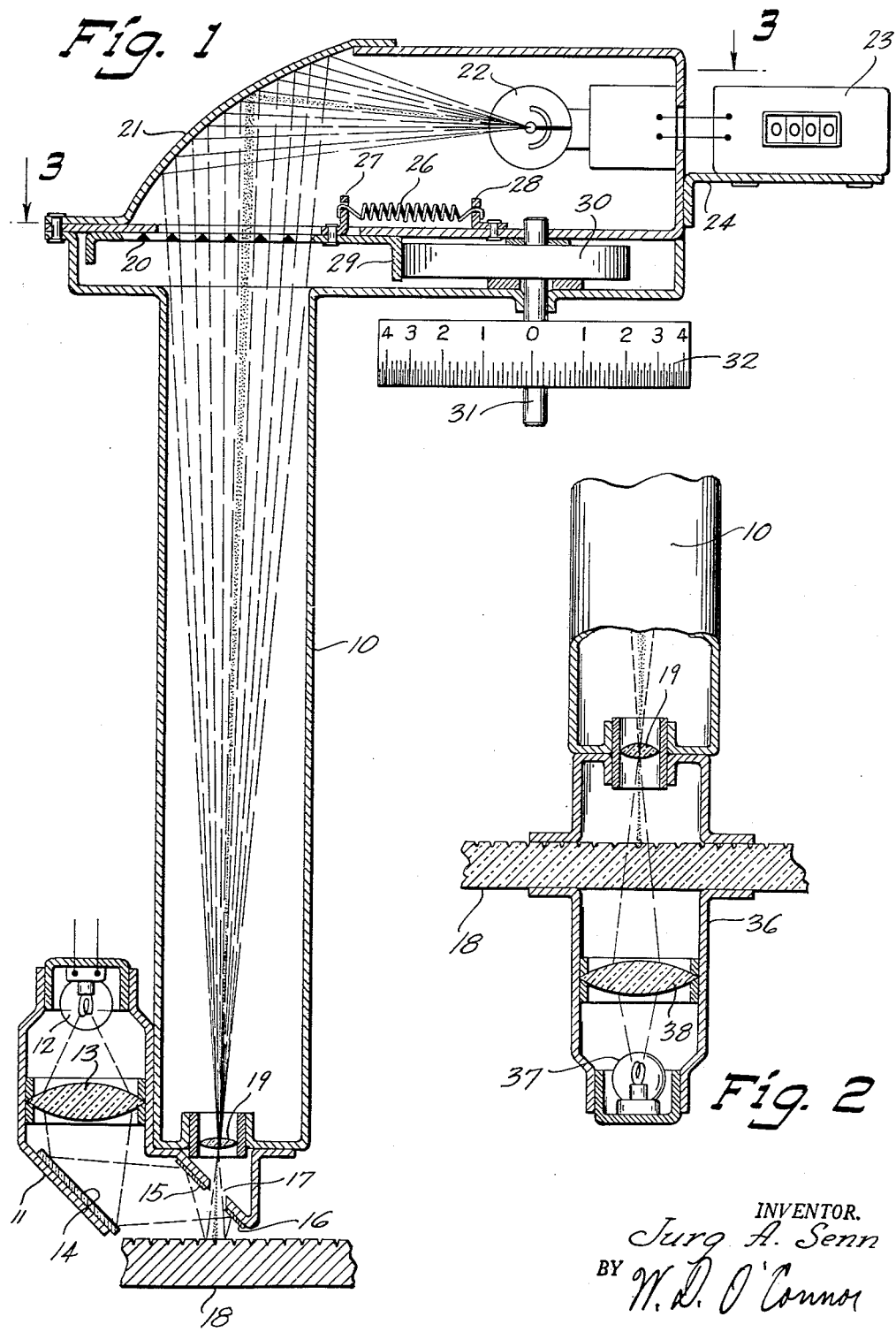

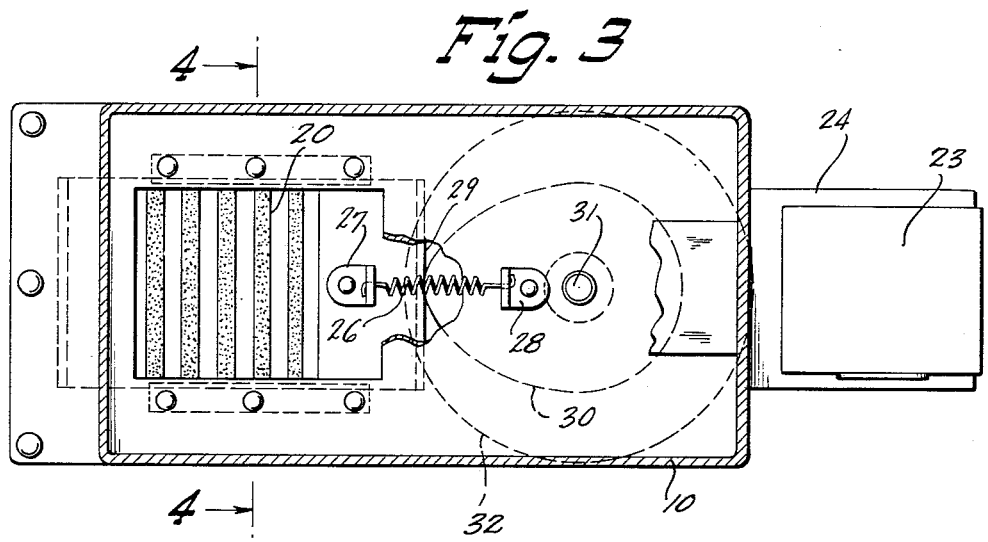
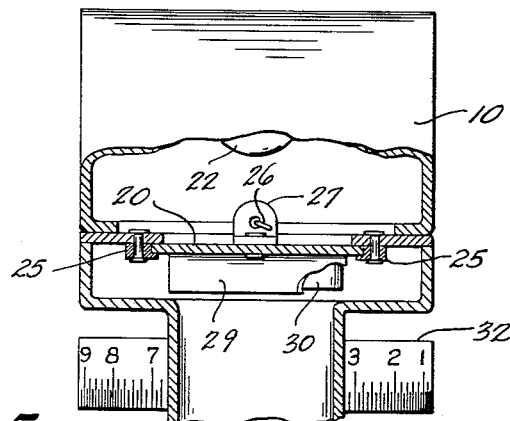
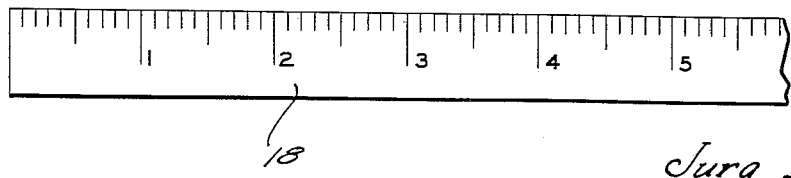
INVENTOR.
Jurg A. Senn
BY W. D. O'Connor
Attorney

2,720,810

MEASURING INSTRUMENT

Jurg A. Senn, Milwaukee, Wis., assignor to Kearney & Trecker Corporation, West Allis, Wis., a corporation of Wisconsin Application January 29, 1949, Serial No. 73,598

3 Claims. (Cl. 88—14)

This invention relates generally to measuring instruments and more particularly to an improved optical system for effecting measurements.

A general object of the invention is to provide an improved measuring instrument for making linear or angular measurements.

Another object is to provide an improved optical apparatus for accurately reading a fraction of the smallest division of a scale or protractor.

Another object is to provide a mechanism which will automatically indicate relative movement in respect to a scale or protractor of a fraction of the smallest division of the scale or protractor.

Another object is to provide an instrument which will photoelectrically translate relative movement of a scale or protractor into fractions of the smallest division of such scale or protractor from an enlarged projection of the division.

Another object is to provide an instrument which optically and photoelectrically translates relative movement into a numerical value representing units of measurement.

According to this invention, an improved instrument for effecting measurements is provided with a light source directed to illuminate a portion of a scale or protractor as the case may be. The scale is provided with graduation lines having a different light transmission or reflection characteristic than the background to permit the image of the scale to be projected by an objective onto a grid. The grid is comprised of alternate transparent and opaque strips which divide the projected image of the scale into a predetermined number of individual light beams. The individual light beams are intercepted by a focusing element which serves to converge them to a common point. A photoelectric cell is located at the focal point of the focusing element to receive the individual light beams emanating from the grid. It is connected to visually indicate a variation in the amount of light striking it. As relative movement of the scale and grid is effected, a change in the quantity of light passing through the grid will occur each time the projection of a division line of the scale passes from one to the other of the transparent and opaque strips of the grid. Such change in the quantity of light passing through the grid is indicated by the operation of the photoelectric cell. Each change in the amount of light received by the photoelectric cell indicates relative movement of a fraction of the smallest division of the scale determined from the number of strips of the grid embraced by the projection of one division of the scale. By observing the number of light changes striking the photo-electric cell, the amount of relative movement can be accurately ascertained. The accuracy of the device is further increased by providing a supplemental scale which permits measurement of the amount of relative movement between light changes. The foregoing and other objects of the invention, which will become more fully apparent from the following detailed description, may be achieved by means of the exemplifying apparatus depicted in and described in connection with the accompanying drawings, in which:

Figure 1 is a view partly in vertical section and partly in elevation of a measuring instrument embodying the present invention;

Fig. 2 is a fragmentary view in vertical section illustrating a modification of the scale projecting apparatus;

Fig. 3 is a view in horizontal section taken substantially on the plane represented by the line 3—3 in Fig. 1 showing the grid and cam arrangement;

Fig. 4 is a fragmentary view in vertical section taken on the plane represented by the line 4—4 in Fig. 3; and, Fig. 5 is a plan view of the scale shown in Figs. 1 and 2.

Referring more specifically to the drawings and particularly to Fig. 1 thereof, the embodiment of the invention there shown is in the form of an instrument including two housing elements 10 and 11 in juxtaposition for enveloping a scale-scanning beam of light emanating from a source 12 which in this instance is an incandescent light bulb located in the housing 11. The light is directed to a focusing lens 13 from which it is transmitted to a mirror 14 positioned at an angle for reflecting the light to the right from the position shown in Fig. 1 to strike a pair of angularly disposed mirrors 15 and 16, one mirror being located on each side of an opening or slot 17 provided in the housing 11 in alignment with the axis of the housing 10. The light striking the mirrors 15 and 16 is reflected onto a master scale 18 which it will be assumed for the purpose of this description, has a reflective background with non-reflective dividing lines which will absorb the light striking them, although greater sensitivity may be obtained in the instrument by providing reflective dividing lines against a non-reflective background. The reflection from the master scale 18 passes through the opening 17 to an objective 19 mounted in the housing 10. The objective 19 serves to project the image of the scale 18 axially through the housing 10 onto a grid 20 slidably mounted in the upper portion of the housing 10.

The grid 20 is comprised of relatively transparent and opaque strips of equal width alternately placed. The transparent strips are indicated in white in Figs. 1 and 3, while the opaque strips are shown in black. Since the opaque strips obstruct the passage of light, the grid 20 divides the light projected from the objective 19 into a series of individual light beams, the number depending upon the number of transparent strips of the grid 20 included in the projection of the scale. The individual light beams passing through the grid 20 strike a curved reflecting element 21 at the top of the housing 10 formed in such a manner as to focus the light to a point on a photoelectric cell 22, connected to actuate a counting mechanism 23 supported on the outside of the housing 10 by a bracket 24. The present embodiment includes only one photoelectric cell but if greater sensitivity were desired, a photoelectric cell could be provided for each light beam emanating from the grid 20.

The projection of the image of the scale 18 results in a shadow being cast by the dividing line because of its non-reflective surface, the shadow being represented in Figs. 1 and 2 by the dark area originating from a dividing line of the scale 18. The arrangement is such that the projection of the smallest division of the scale 18 embraces a predetermined number of strips of the grid 20. The number of strips to be covered by the projection of the smallest division of the scale 18 may vary, depending upon the number of units into which it is desired to divide the projection, in this instance the smallest division of the scale being divided into ten units resulting in five individual beams of light striking the reflecting element 21, separated from each other by spaces of the same width as the light beams.

When relative movement is effected between the scale 18 and the housing 10, the shadow cast by the dividing line of the scale 18 will pass alternately from an opaque strip to a transparent strip and on to the next opaque strip of the grid 20. As the shadow passes onto a transparent strip from an opaque strip, it will substantially decrease the amount of light passing through that particular transparent strip and, consequently, diminish the total quantity of light striking the photoelectric cell 22. When the quantity of light striking the photoelectric cell 22 reaches a predetermined minimum, the photoelectric cell actuates the counting mechanism 23 to indicate an increase of one unit.

The scale illustrated in Fig. 5 is divided into tenths of an inch and the grid 20 divides the tenth of an inch into 10 equal parts so one unit on the counting mechanism 23 represents a movement of one one-hundredth of an inch. As relative movement between the scale 18 and the housing 10 continues, the shadow cast by the dividing line of the scale 18 will pass from a transparent strip of the grid 20 to its adjacent opaque strip where the shadow does not interfere with the passage of light through any of the transparent strips. Accordingly, the amount of light passing through the grid 20 and striking the photoelectric cell 22 increases to a maximum at which point the counting mechanism 23 is again actuated to indicate movement of another one one-hundredth of an inch.

If a photoelectric cell is provided for each light beam emanating from the grid 20, they may be arranged to actuate the counter 23 either backward or forward to correspond with the direction of relative movement. Thus when relative movement is in one direction, units will be subtracted from the counter and when relative movement is effected in the opposite direction, units are added to the counter.

The accuracy of the instrument is further increased by providing means for measuring the relative movement beyond the point at which the counting mechanism 23 was last actuated. To this end, the grid 20 is movable relative to the housing 10, being slidable on brackets 25 as illustrated in Fig. 4. A tension spring 26 is supported between two brackets 27 and 28, the bracket 27 being attached to the grid 20 while the bracket 28 is secured to the housing 10. The tension spring 26 serves to continually draw the grid 20 to the right as viewed in Fig. 1, to retain a depending ledge 29 of the grid 20 in constant contact with an eccentric or spiral cam 30. The contour of the cam 30 is shown in Figs. 1 and 3, greatly exaggerated for the purpose of clarifying this description although in actual practice it would be only a slight departure from a true circle.

A shaft 31 journalled in the housing 10 supports the cam 30 and a cooperating circular graduated scale 32 so that both the cam 30 and the scale 32 will revolve with the shaft. The scale 32 as illustrated in Fig. 1 for application with the present embodiment, is graduated in terms of .001 inch with the smallest subdivision of the scale representing a movement of .0001 inch. To effect movement of the grid 20, the shaft 31 is turned to rotate both the cam 30 and the scale 32. Any rotation of the cam 30 from the position shown in Fig. 3, will function to permit the spring 26 to draw the grid 20 to the right as the ledge 29 is in contact with the contour of the cam 30 at the point farthest from its center. The scale 32 is calibrated with the contour of the cam to precisely indicate, with the cooperation of a pointer (not shown), the distance of movement of the grid 20.

For the purpose of illustrating a practical application of the present invention, it will be assumed that it is desired to move a machine tool table 35.1986 inches. The scale may be mounted on the machine tool table while the housing 10 of the instrument is secured to the structure of the machine, although if more convenient, the opposite arrangement would function just as satisfactorily. The circular scale 32 is set to zero and the table then put in motion. The scale 18 is so arranged that the graduation numbers are not covered by the housing 10 and are readily visible to the operator for conveniently determining when the desired final position of the table is being approached. Each time a movement of .01 of an inch is effected, the counter 23 is actuated once, so that in this instance, the table will be moved until a reading of 35.19 is obtained on the face of the counter 23. At the moment that the desired reading is obtained on the counter, movement of the table is terminated. The shaft 31 is then manipulated to move the grid 20 through .0086 inch as indicated on the circular scale 32, in a direction opposite to the direction in which the scale 18 was moving. Since the grid 20 was moved backward .0086 inch from the point where the counter 23 was last actuated, it follows that an identical movement of the scale 18 in the opposite direction will again actuate the counter 23. The machine tool table is therefore moved until the counter is again actuated, resulting in a total movement of the table of 35.1986 inches. Other means for obtaining the final adjustment in cooperation with the circular scale 32 may be arranged to suit the particular circumstances of application.

One variation of the described embodiment of the invention is illustrated in Fig. 2 wherein the scale 18 is fabricated of a transparent material with opaque dividing lines and the light passes through it to the housing 10. The scale 18 is located between the housing 10 and a housing 36, the latter containing a light source 37 and a focusing lens 38. The light is transmitted from the source 37 to the focusing lens 38 and thence through the transparent scale 18 to the objective 19 mounted in the housing 10. The objective 19 projects the image of the scale 18 onto the grid 20 which functions, as previously described, to drive the smaller division of the scale 18 into the established increments.

The embodiments of the invention described herein illustrate its use in connection with accomplishing linear measurements, but it is to be understood that it may be used as effectively for performing angular measurements. For precise angular measurements, the instrument is utilized to subdivide the smallest of a protratcor or the like in the same manner as described for use with a linear scale.

From the foregoing description and explanation of the operation of specific embodiments of this invention, it is evident that the invention has provided an improved instrument for effecting plane measurements, either lineal or angular, that is capable of accomplishing measurements with a high degree of accuracy and yet, being of simple construction, is very easy to operate.

Although only two embodiments of the invention have been shown as illustrative of preferred apparatus operative in accordance with this invention, various other modifications may be devised by skilled mechanics in utilizing the principles herein set forth, without departing from the spirit and scope of the invention as defined in the subjoined claims.

The principles of the invention having now been fully explained in connection with the foregoing description of illustrative embodying apparatus, the invention is hereby claimed as follows:

1. In an optical measuring apparatus, a scale having graduation lines with light transmission qualities different than the background, means operable to optically project an image of a portion of said scale, a dividing element located to receive the projection of said scale and divide the projection of one subdivision of said scale into a predetermined number of individual light beams of equal width with spaces between them of the same width, and means supported in the path of the light passing through said dividing element to indicate variations in the quantity of light passing through the dividing element caused by the projection of a graduation line of said scale passing onto or beyond the path of one of said light beams, whereby two variations in the amount of light passing said dividing element indicate a relative movement of said dividing element and said scale of a fraction of a subdivision of said scale depending upon the number of portions into which the projection of one subdivision of said scale is divided by said dividing element.

2. In an apparatus for accomplishing measurements, a scale with markings having different light transmission qualities than the background, a source of light directed to illuminate said scale, optical projecting means located to project an image of part of said scale, a grid comprised of a plurality of strips of equal width separated from each other by strips of the same width having different light transmission qualities, said grid being mounted in position to receive the projected image of said scale and divide the projection of one subdivision of said scale into a predetermined number of individual light beams, means connected to indicate a variation in the amount of light passing through said grid as the projected image of a marking of said scale passes from one strip to the succeeding strip of said grid when relative movement of said scale and said grid is effected, and adjusting means connected to effect movement of said grid relative to said optical projecting means and thereby operative to measure relative movement of said scale and said grid beyond the point which caused the last variation in the amount of light passing through said grid, whereby relative movement of a fraction of a subdivision of said scale may be determined by counting the variations in quantity of light passing said grid, and the distance of relative movement beyond the point which caused the last light variation may be determined by operating said adjusting means.

3. In an apparatus for accomplishing measurements, a housing, a master scale movable relative to said housing having graduation lines of different light transmission qualities than the background, a light source located to project the image of said master scale, a grid slidably mounted in said housing comprised of strips of equal width separated from each other by strips of the same width with different light transmission qualities, said grid being mounted in said housing to receive the projected image of said scale and divide the projection of one subdivision of said master scale into a predetermined number of individual light beams, a light sensitive element supported in the path of the light passing through said grid and operative to indicate any variations in the amount of light passing through said grid caused when the projection of a graduation line of said master scale enters or leaves the path of one of the light beams emanating from said grid, adjusting means operatively connected to said grid in manner to effect relative movement between said grid and said housing, and a second scale connected to measure the relative movement between said grid and said housing, whereby as relative movement between said housing and said scale is effected, each variation in the amount of light passing through said grid is recorded by said light sensitive element to indicate movement of a fraction of a subdivision of said master scale determined from the number of light beams into which the projection of one subdivision of said scale is divided by said grid, and the relative movement beyond the last light variation of a lesser amount than that required to effect another light variation may be determined from said second scale by moving said grid relative to said housing until a light variation occurs, and observing the distance of such a movement on said second scale.

References Cited in the file of this patent
UNITED STATES PATENTS

| | | |
|---|---|---|
| 2,351,955 | Graf | June 20, 1944 |
| 2,394,820 | Syrcher et al. | Feb. 12, 1946 |
| 2,406,299 | Koulicovitch | Aug. 20, 1946 |
| 2,422,611 | Becker et al. | June 17, 1947 |
| 2,520,758 | Crownover | Aug. 29, 1950 |